United States Patent
Arquero et al.

(10) Patent No.: US 9,860,280 B1
(45) Date of Patent: Jan. 2, 2018

(54) COGNITIVE AUTHENTICATION WITH EMPLOYEE ONBOARDING

(71) Applicant: INTERNATIONAL BUSINESS MACHINES CORPORATION, Armonk, NY (US)

(72) Inventors: Gregg M. Arquero, Poughkeepsie, NY (US); Eli M. Dow, Wappingers Falls, NY (US); Syed F. Hossain, Hopewell Junction, NY (US); Joshua A. Schaeffer, White Plains, NY (US); Yunli Tang, Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/269,330

(22) Filed: Sep. 19, 2016

(51) Int. Cl.
*H04L 29/06* (2006.01)

(52) U.S. Cl.
CPC .......... *H04L 63/20* (2013.01); *H04L 63/104* (2013.01); *H04L 63/105* (2013.01)

(58) Field of Classification Search
CPC ....... G06F 21/57; H04L 63/20; H04L 63/104; H04L 63/105
USPC .......................................................... 726/1–5
See application file for complete search history.

(56) References Cited

U.S. PATENT DOCUMENTS

| | | |
|---|---|---|
| 5,818,936 A | 10/1998 | Mashayekhi |
| 2004/0250120 A1 | 12/2004 | Ng |
| 2005/0138061 A1 | 6/2005 | Kuehr-McLaren et al. |
| 2006/0042483 A1* | 3/2006 | Work ...................... G06Q 10/00 726/3 |
| 2009/0132813 A1* | 5/2009 | Schibuk ............... G06Q 20/223 713/158 |
| 2010/0281513 A1 | 11/2010 | Richards et al. |
| 2012/0137340 A1 | 5/2012 | Jakobsson et al. |
| 2012/0191596 A1* | 7/2012 | Kremen ................. G06Q 40/02 705/38 |
| 2012/0271855 A1* | 10/2012 | Faitelson ............. G06F 21/604 707/785 |
| 2013/0247209 A1 | 9/2013 | Didcock et al. |

(Continued)

OTHER PUBLICATIONS

Amazon, Predict an Employee's Access Needs, Given His/Her Job Role, May 29, 2013, https://www.kaggle.com/c/amazon-employee-access-challenge.

(Continued)

*Primary Examiner* — Haresh N Patel
(74) *Attorney, Agent, or Firm* — Cantor Colburn LLP; Steven Chiu

(57) ABSTRACT

Embodiments include method, systems and computer program products for onboarding a new employee to an organization. Aspects include receiving, by a processor, employee data comprising an employee group associated with the new employee of the organization. Identifying other employees that belong to the employee group and obtaining a set of permissions associated with each of the other employees. Determining a set of group permissions based on a combination of the set of permissions of each of the other employees. Aspects also include calculating an access score for each of the set of group permissions, and determining a set of suggested access permissions for the new employee based on the set of group permissions and the access score.

17 Claims, 7 Drawing Sheets

(56) References Cited

U.S. PATENT DOCUMENTS

| | | | | |
|---|---|---|---|---|
| 2014/0129268 A1* | 5/2014 | B'Far | ............ | G06Q 10/063112 |
| | | | | 705/7.11 |
| 2015/0006431 A1* | 1/2015 | Fu | ........................ | G06Q 10/105 |
| | | | | 705/342 |
| 2015/0135305 A1* | 5/2015 | Cabrera | .................. | G06F 21/62 |
| | | | | 726/17 |
| 2015/0242621 A1* | 8/2015 | Jackson | .............. | G06F 21/6281 |
| | | | | 726/17 |
| 2015/0341357 A1* | 11/2015 | Rambur | ................ | H04L 63/105 |
| | | | | 726/3 |
| 2016/0057150 A1* | 2/2016 | Choi | ..................... | H04L 63/102 |
| | | | | 726/1 |
| 2016/0292179 A1* | 10/2016 | von Muhlen | ..... | G06F 17/30165 |
| | | | | 726/4 |

OTHER PUBLICATIONS

Zhou, et al., "Predict Employees' Computer Access Needs in Company", Dec 15, 2015, http://cs229.stanford.edu/proj2015/240_report.pdf, pp. 1-6.

\* cited by examiner

COGNITIVE AUTHENTICATION WITH EMPLOYEE ONBOARDING

BACKGROUND

The present disclosure relates to new-hire onboarding and, more specifically, to methods and systems for onboarding an employee in an organization.

Role based control systems comprise an emerging and promising class of control systems that simplify and streamline the control task by elevating system control rules and decisions from the individual user or process level to a group level. This is particularly, applicable to human resource systems and employee authorization and security systems which are designed to on-board newly hired employees in an organization. In particular, the grouping of identities in a role based control system reflects the roles the corresponding individuals have as part of an organization that owns, controls, and/or manages the system.

SUMMARY

Embodiments include a computer-implemented method for onboarding a new employee to an organization, the method includes receiving, by a processor, employee data comprising an employee group associated with the new employee of the organization. Identifying other employees that belong to the employee group and obtaining a set of permissions associated with each of the other employees. Determining a set of group permissions based on a combination of the set of permissions of each of the other employees. Calculating an access score for each of the set of group permissions, and determining a set of suggested access permissions for the new employee based on the set of group permissions and the access score.

Embodiments include a computer system for onboarding a new employee to an organization, the computer system having a processor, the processor configured to perform a method. The method includes receiving, by a processor, employee data comprising an employee group associated with the new employee of the organization. Identifying other employees that belong to the employee group and obtaining a set of permissions associated with each of the other employees. Determining a set of group permissions based on a combination of the set of permissions of each of the other employees. Calculating an access score for each of the set of group permissions, and determining a set of suggested access permissions for the new employee based on the set of group permissions and the access score.

Embodiments also include a computer program product for onboarding a new employee to an organization, the computer program product including a non-transitory computer readable storage medium having computer readable program code embodied therewith. The computer readable program code including computer readable program code configured to perform a method. The method includes receiving, by a processor, employee data comprising an employee group associated with the new employee of the organization. Identifying other employees that belong to the employee group and obtaining a set of permissions associated with each of the other employees. Determining a set of group permissions based on a combination of the set of permissions of each of the other employees. Calculating an access score for each of the set of group permissions, and determining a set of suggested access permissions for the new employee based on the set of group permissions and the access score.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The foregoing and other features and advantages of the invention are apparent from the following detailed description taken in conjunction with the accompanying drawings in which:

DETAILED DESCRIPTION

Figure 1:
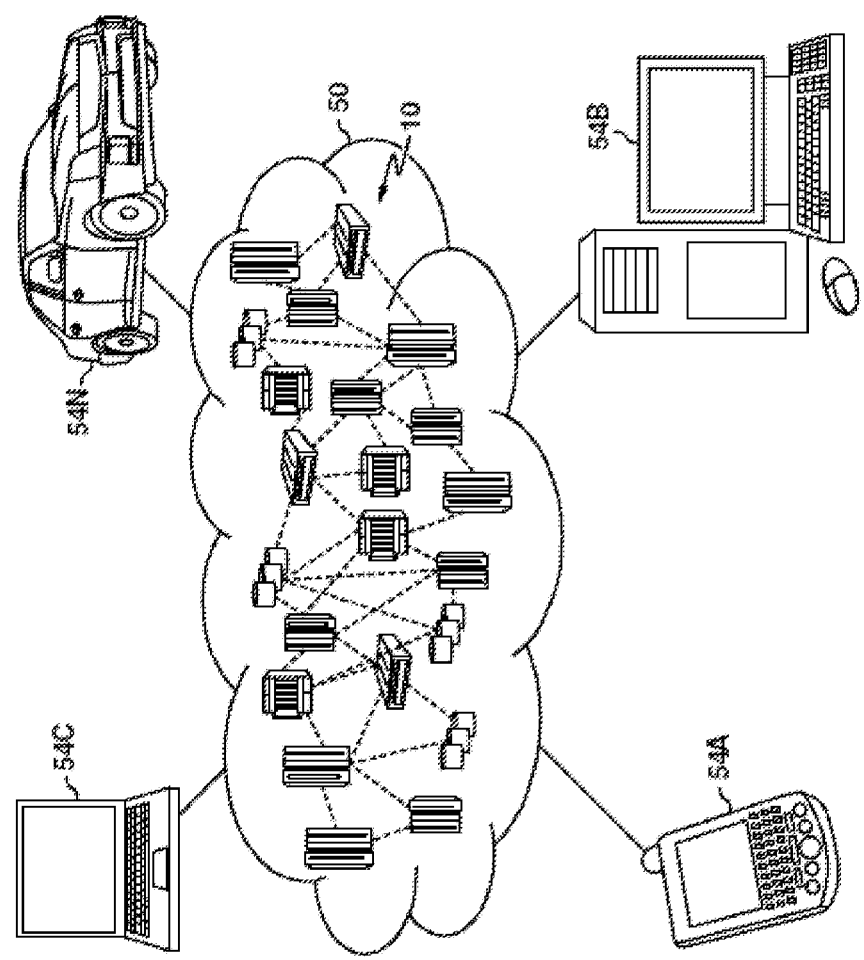
FIG. 1 depicts a cloud computing environment according to one or more embodiments of the present invention.

In accordance with exemplary embodiments of the disclosure, methods, systems and computer program products for onboarding a new employee to an organization are provided. In one or more exemplary embodiments, methods for onboarding a new employee to an organization include receiving employee data regarding the employee group of the new employee. Based upon this employee group, the other employees in the same employee group have a set of access control permissions for each of the other employees. An access score for each of the set of access control permissions is then created after reviewing the number of employees within the employee group that have the same access control permission. For example, if there are 10 employees and 7 employees have particular access control permission, the access score can be 7. Based upon this score, a set of suggested access control permission is then derived and delivered to a manager or administrator for review and granting or denying of the access control permissions to the new employee.

Managers and team leaders often need to approve the access control requests prior to on-boarding new employees or wait until that employee self-requests access. The current systems waste time and are inefficient because it is up to the managers to coordinate with the people with authority to grant access to specific things. Often times the managers are backed up with work that these requests become a low priority or the manager may simply forget to request access. Also, the new employees may not know what type of access is needed to be able to perform their job effectively. The present invention streamlines the process of new hire authentication to reduce the loss of productivity in the transaction period.

The present invention provides new hire onboarding works on an employee and permission system that utilizes lightweight directory access protocol (LDAP). LDAP has emerged as an IETF open standard to provide directory services to applications ranging from e-mail systems to distributed system management tools. LDAP is an evolving protocol that is based on a client-server model in which a client makes a TCP/IP connection to an LDAP server, sends requests, and receives responses. The LDAP information model, in particular, is based on an "entry," which contains information about some object. Entries are typically organized in a specified tree structure, and each entry is composed of attributes.

LDAP provides a number of known functions including query (search and compare), update, authentication and others. The search and compare operations are used to retrieve information from the database. For the search function, the criterion of the search is specified in a search filter. The search filter typically is a Boolean expression that consists of an attribute name, attribute value and Boolean operations like AND, OR and NOT. Users can use the filter to perform complex search operations.

In one or more embodiments, the present invention determines the correct security permissions to be granted to new identifiers in an access control group. An access control group can include managers or another authoritarian figure with discretionary approval over access credentials. The access control group has previously authenticated others in their department.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
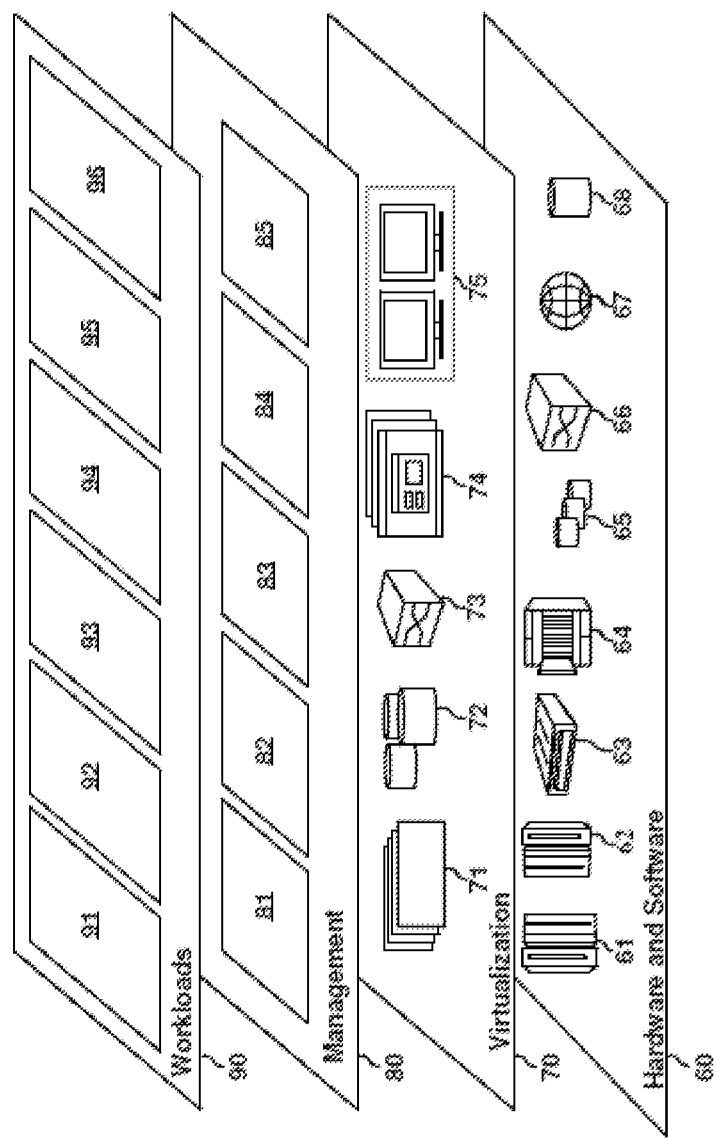
FIG. 2 depicts abstraction model layers according to one or more embodiments of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and onboarding a new employee to an organization 96.

Figure 3:
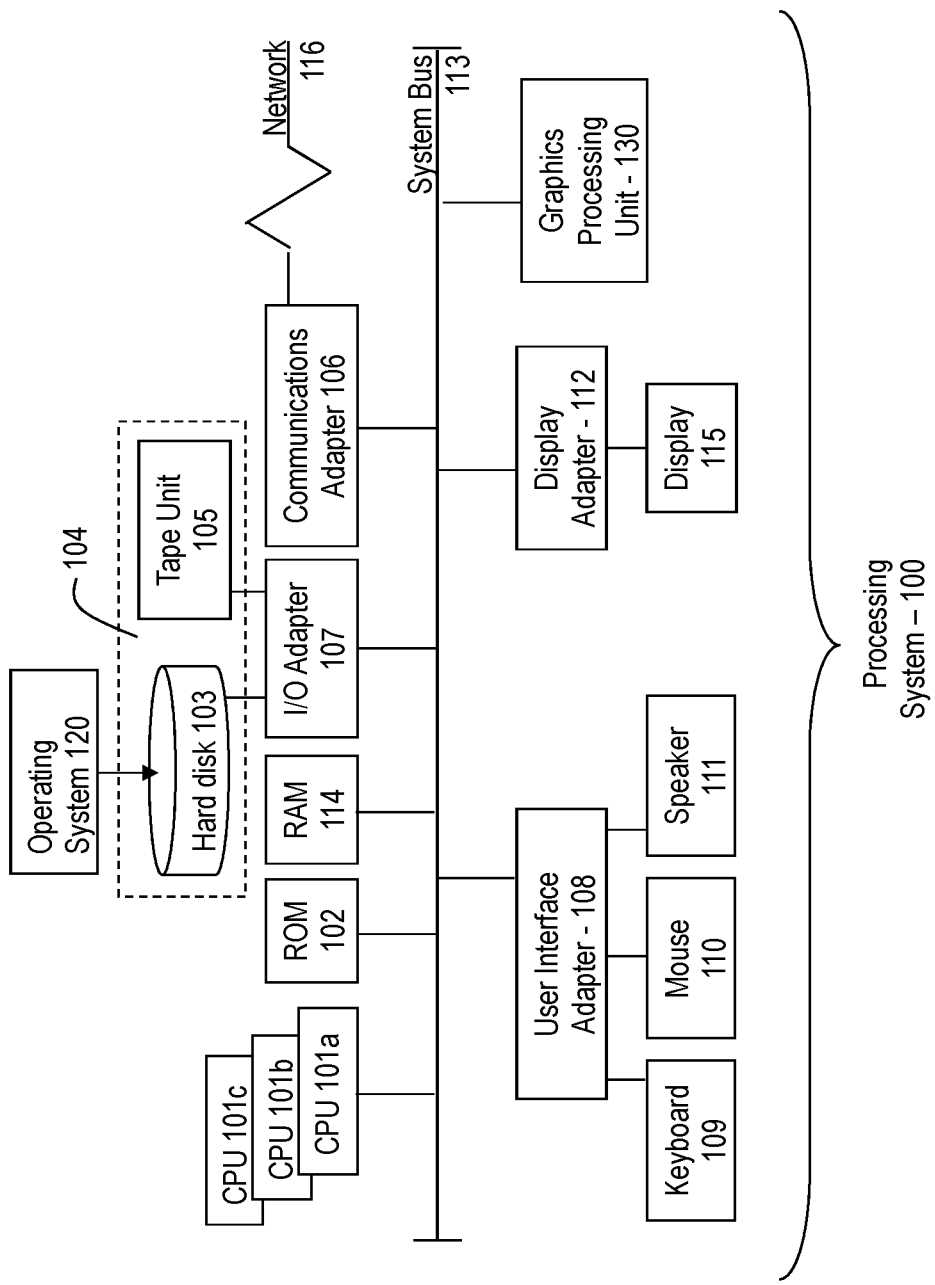
FIG. 3 illustrates a block diagram of a computer system for use in practicing the teachings herein.

Referring to FIG. 3, there is shown an embodiment of a processing system 100 for implementing the teachings herein. In this embodiment, the system 100 has one or more central processing units (processors) 101a, 101b, 101c, etc. (collectively or generically referred to as processor(s) 101). In one or more embodiments, each processor 101 may include a reduced instruction set computer (RISC) microprocessor. Processors 101 are coupled to system memory 114 and various other components via a system bus 113. Read only memory (ROM) 102 is coupled to the system bus 113 and may include a basic input/output system (BIOS), which controls certain basic functions of system 100.

FIG. 3 further depicts an input/output (I/O) adapter 107 and a network adapter 106 coupled to the system bus 113. I/O adapter 107 may be a small computer system interface (SCSI) adapter that communicates with a hard disk 103 and/or tape storage drive 105 or any other similar component. I/O adapter 107, hard disk 103, and tape storage device 105 are collectively referred to herein as mass storage 104. Operating system 120 for execution on the processing system 100 may be stored in mass storage 104. A network adapter 106 interconnects bus 113 with an outside network 116 enabling data processing system 100 to communicate with other such systems. A screen (e.g., a display monitor) 115 is connected to system bus 113 by display adaptor 112, which may include a graphics adapter to improve the performance of graphics intensive applications and a video controller. In one embodiment, adapters 107, 106, and 112 may be connected to one or more I/O busses that are connected to system bus 113 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 113 via user interface adapter 108 and display adapter 112. A keyboard 109, mouse 110, and speaker 111 all interconnected to bus 113 via user interface adapter 108, which may include, for example, a Super I/O chip integrating multiple device adapters into a single integrated circuit.

In exemplary embodiments, the processing system 100 includes a graphics processing unit 130. Graphics processing unit 130 is a specialized electronic circuit designed to manipulate and alter memory to accelerate the creation of images in a frame buffer intended for output to a display. In general, graphics processing unit 130 is very efficient at manipulating computer graphics and image processing and has a highly parallel structure that makes it more effective than general-purpose CPUs for algorithms where processing of large blocks of data is done in parallel.

Thus, as configured in FIG. 3, the system 100 includes processing capability in the form of processors 101, storage capability including system memory 114 and mass storage 104, input means such as keyboard 109 and mouse 110, and output capability including speaker 111 and display 115. In one embodiment, a portion of system memory 114 and mass storage 104 collectively store an operating system coordinate the functions of the various components shown in FIG. 3.

Figure 4:
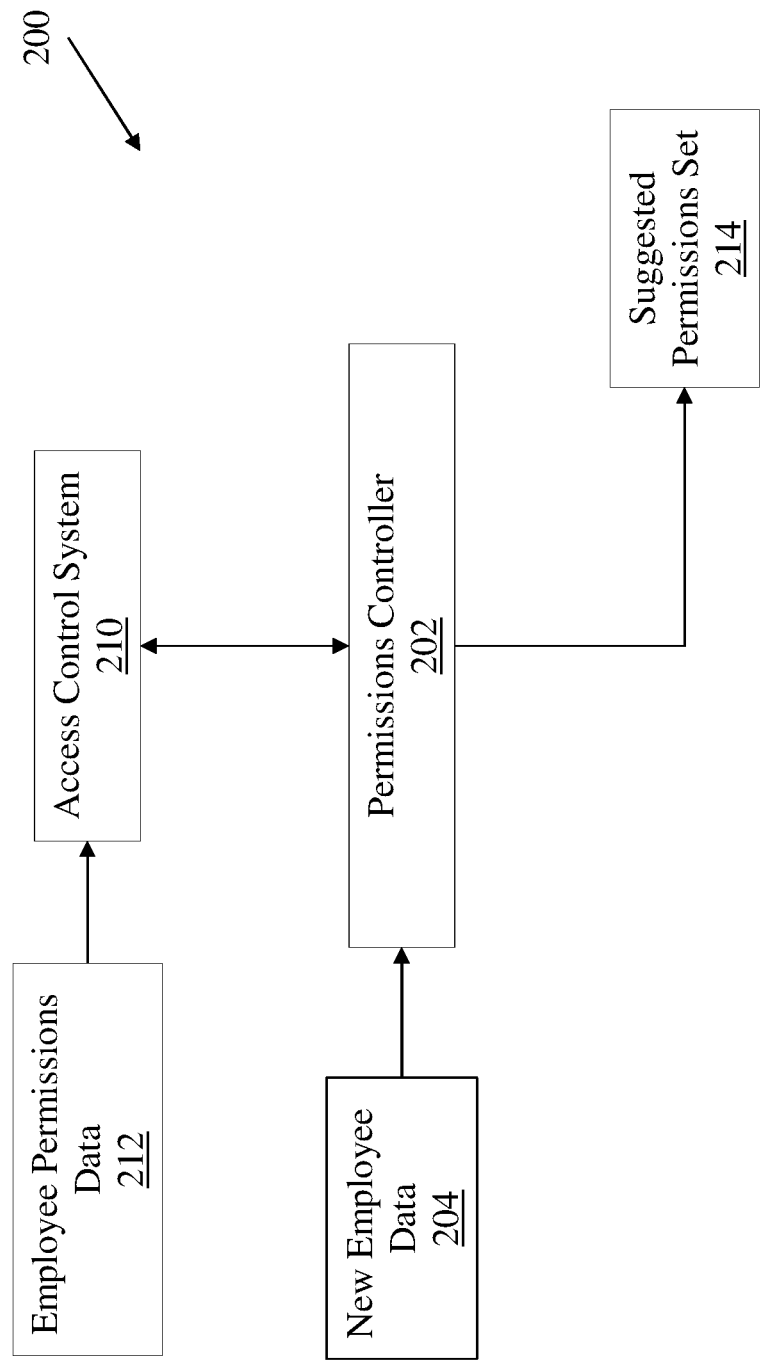
FIG. 4 illustrates a block diagram of a system for onboarding a new employee to an organization in accordance with one or more embodiments.

Referring to FIG. 4 there is shown a system 200 for new-hire onboarding according to one or more embodiments. The system 200 includes a permissions controller 202, new employee data 204, an access control system 210, employee permissions data 212, and a suggested permissions set 214.

In one or more embodiments, the permissions controller 202 can be implemented on the processing system 100 found in FIG. 3. The permissions controller 202 takes as an input, employee data 204 which includes the group or division within an organization that the new employee belongs to. A new employee can be either a newly hired employee to the organization or an existing employee who has transitioned to another group or division within the organization. An employee is considered to be in the same group or division as another employee when the employee shares the same manager as the other employee. In an organization, employees have access to certain systems, programs, and physical locations. This access is referred to as permissions. For example, permission for email access to the organization's email system can be granted for a new employee. This permission for email access can be granted, denied, and revoked based upon the status of the employee. The granting, denying, and revocation can be done by a manager, an administrator, or any individual with sufficient authority within the organization.

Based upon the new employee data 204, the permissions controller 202 queries the access control system 210 for permissions for other employees that are in the same group as the onboarding employee. The access control system 210 can be any system that manages control and access to systems, programs, and physical location. For example, a key card management system can permit, deny, and revoke access to physical rooms or buildings within an organization. The illustrative example shows only one access control system 210; however, multiple access control systems can be queried by the permission controller 202. The access control system 210, based upon the query, returns employee permissions data 212 to the permissions controller 202. The employee permissions data 212 can be specific to employees that work in a certain group within the organization. For example, a group, such as software development, will have a certain set of permissions that are either specific to the employee group or may be shared amongst employees in other departments outside the software development group.

In one or more embodiments, the system 200 utilizes a lightweight directory access protocol (LDAP) structure. The new employee data 204 contains information about an employee group which corresponds to an employee LDAP hierarchal structure which identifies a single LDAP group as being the new employee group.

In one or more embodiments, the permission controller 202 analyzes the employee permissions data 212 to determine a suggested permissions set 214 for the onboarding employee. The employee permissions data 212 includes any number of permissions granted to other employees within the same employee group as the onboarding employee. These permissions can range from folder access permission to the physical building or office access permissions. The permission controller 202 analyzes this employee permissions data 212 and looks for intersections of each of the other employees to determine a set of suggested permissions for the new employee. The suggested permissions can be ordered where the number of other employees with the highest intersection of permissions is listed at the top of the ordered list and permissions where only a small number of employees within the group have the permission can be listed at the bottom of the ordered list. In alternate embodiments, the suggested permissions set 214 can be in the order of highest priority permission. For example, necessary permissions such as email or phone access may be listed at the top of the suggested permissions set 214 to draw immediate attention to these necessary permissions.

In one or more embodiments, the suggested permissions set can be compared to a threshold value. The threshold value can be set at a certain number or percentage and any individual permission within the suggested permissions set 214 that exceeds the threshold can be automatically granted. For example, if at least 75% of the other employees in an employee group have a certain permission, then that certain permission can be automatically granted to the onboarding employee. Any permissions that do not exceed the threshold would remain present in the suggested permissions set 214 for review and approval by a manager or an administrator. The threshold value may be a lower threshold value such that any permissions that are lower than the threshold are excluded from the suggested permissions set 214. For example, a manager may only want to see permissions where at least 25% of the other employees in the group have access to these permissions so that the manager can review only permissions that exceed this lower threshold.

Figure 5:
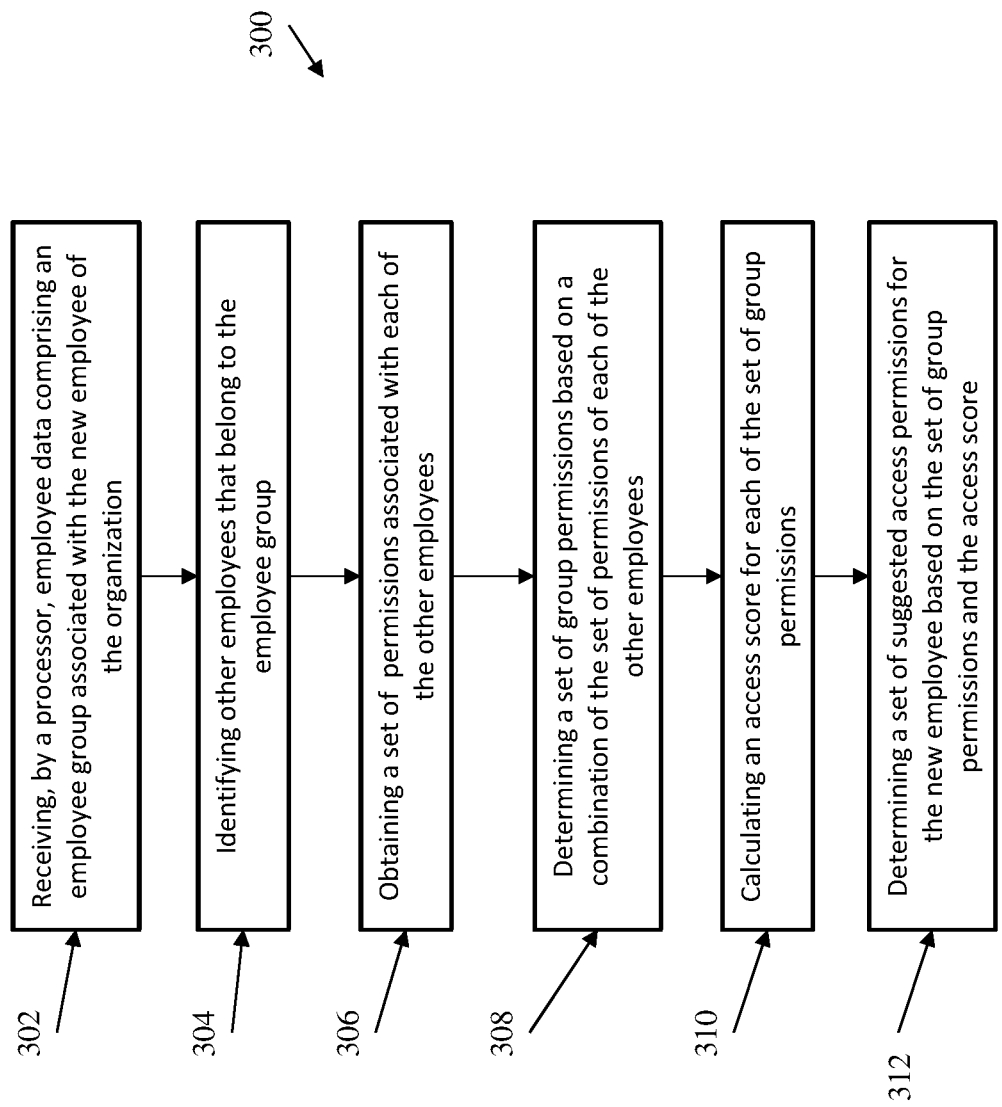
FIG. 5 illustrates a flow diagram of a method for onboarding a new employee to an organization in accordance with one or more embodiments.

Referring now to FIG. 5 there is shown a flow diagram of a method 300 for onboarding new employee to an organization according to one or more embodiments. The method 300 includes receiving, by a processor, employee data comprising an employee group associated with the new employee of the organization, as shown at block 302. At block 304, the method 300 includes identifying other employees that belong to the employee group. The method 300 includes, at block 306, obtaining a set of permissions associated with each of the other employees. The method 300 includes determining a set of group permissions based on a combination of the set of permissions of each of the other employees, as shown at block 308. At block 310, the method 300 includes calculating an access score for each of the set of group permissions. And at block 312, the method 300 includes determining a set of suggested access permissions for the new employee based on the set of group permissions and the access score.

Additional processes may also be included. It should be understood that the processes depicted in FIG. 5 represent illustrations, and that other processes may be added or existing processes may be removed, modified, or rearranged without departing from the scope and spirit of the present disclosure.

Figure 6A:
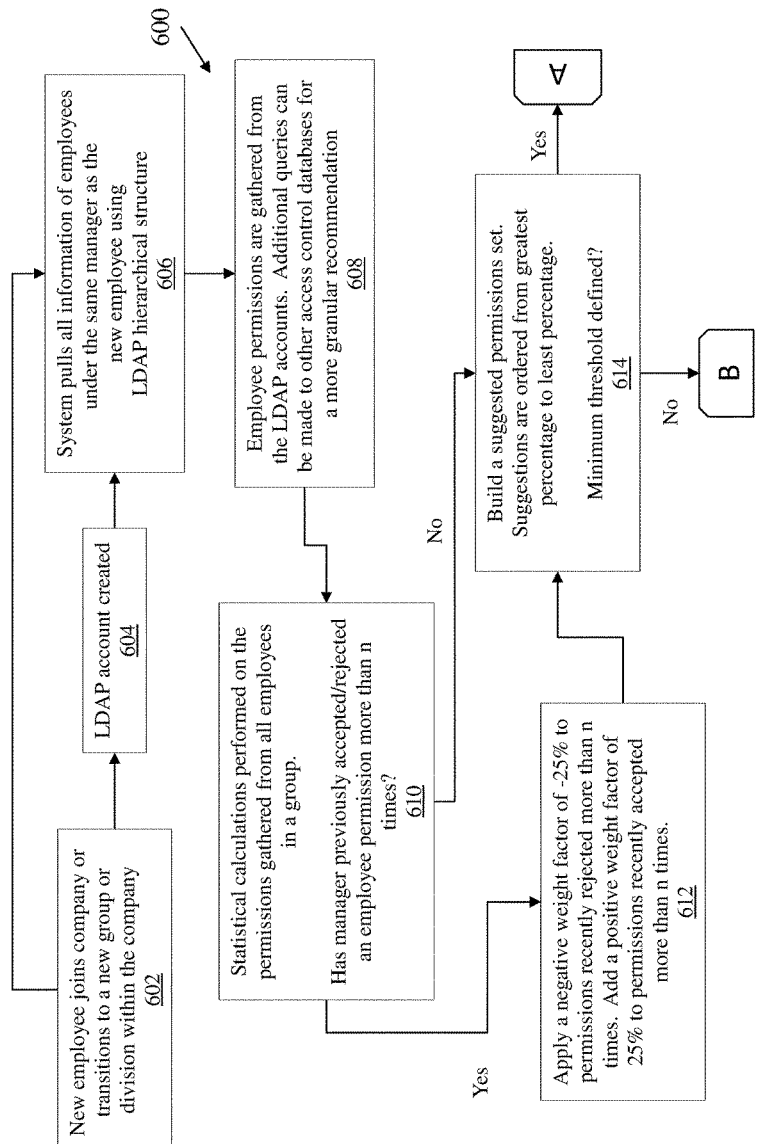
FIG. 6a and FIG. 6b illustrate a flow diagram of a method for onboarding a new employee to an organization in accordance with one or more embodiments.
Figure 6B:
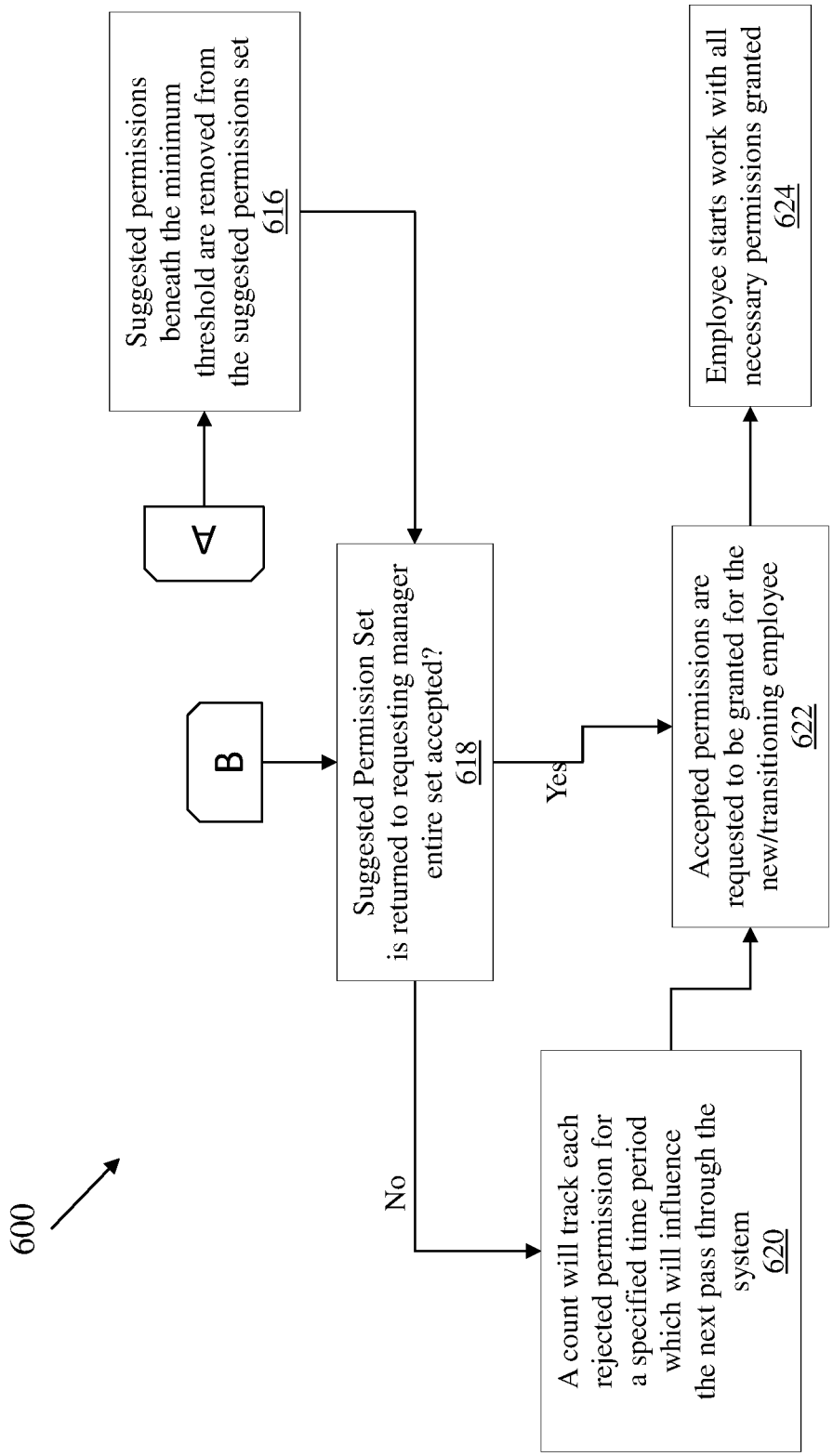

Referring now to FIGS. 6a and 6b there is shown a flow diagram of a method for new-hire onboarding according to one or more embodiments. The method 600 includes a new employee or a transitioning employee joining a new group or division within a company or organization as shown at block 602. The new group or division can be defined by the manager, in an LDAP hierarchal structure. So the new or transitioning employee belongs to a group where the group is defined by the direct manager of the employees. For example, manager Dave has three employees (Alice, Bob, and Charles) that report directly to him in group F. Also, Bob has two employees (Edward and Gerald) that report to Bob. In this example, the group F is defined by Alice, Bob, and Charles and does not include Edward and Gerald who would belong to a separate group where Bob is the manager of that separate group. Referring back to the method 600, at block 604 an LDAP account is created for the new employee. At block 606, the method 600 includes pulling all information for employees under the same manager as the new or transitioning employee utilizing the LDAP structure. Revisiting the above example, if a new employee, Cynthia, joins group F, her manager would be Dave and the employees under the same manager would be Alice, Bob, and Charles. When the system pulls employee information, it will look at Alice, Bob, and Charles. The method 600 then, at block 608, gathers each of the employee permissions in the group that are tied to the employees' LDAP accounts. Additional queries can be performed to more than one access control databases for a more granular analysis of employee permissions. For example, access control for emails systems can be queried as well as access control systems for building access. At block 610, the method 600 performs statistical analysis on the employee permissions data. As an example, the method can look at whether the manager has previously accepted or rejected an employee permission more than n times. The n times can be defined by the manager or defined within the system. If the manager has accepted or rejected the permission more than n times, the method 600 at block 612 applies either a positive or negative weight of, for example, 25% to the permission. This weighted value can either move up or move down the permission on the suggested permissions list. This weighted value may increase or decrease the permission priority or may cause it to be removed from consideration. The method 600 can also look at the trending behavior of a manager in terms of accepting or rejecting a certain permission over a period of time. For example, if in the last 30 days, a manager has rejected access to a physical building for all employees in the employee group, a negative weight can be applied to the permission and could cause the permission to be moved down on a permission set or be removed entirely. The method 600, at block 614, builds a suggested permissions list. The permissions list can be ordered from greatest percentage of employees having the permission to the least percentage of employees having the permission. Additionally, a threshold percentage can be defined.

FIG. 6b further illustrates the method 600 of new-hire onboarding according to one or more embodiments. If a minimum threshold is defined, the method 600 removes suggested permissions that are beneath the minimum threshold as shown at block 616. If a minimum threshold is not defined, the method 600 returns the suggested permissions set to the requesting manager ash shown at block 618. The manager has the option of accepting all permission in the suggested permissions set to grant to the new or transitioning employee as shown at block 622. Or the manager can review the suggested permission set and decide which ones to allow or reject. The method 600, at block 620, tracks each of the rejected and accepted permission for a specified period of time which will contribute to the positive or negative weighting factor as described in block 612. At block 624, the method 600 includes the employee starting work with all the necessary permissions granted by the manager or administrator of the access control systems.

In one or more embodiments, the system 200 classifies certain access control permissions as being a "high risk" access permission. If a high risk access permission is granted by a manager, the system 200 tracks whether the new employee utilizes the access permission. If the employee does not utilize the access permission within a certain amount of time of the granting the access permission, the system 200 will revoke the access permission. This revocation can be done automatically or the revocation can be suggested to a manager or administrator via an email, text message, or the like.

In one or more embodiments, the suggested permissions set 214 can have a weighted value based on the manager's historical trending behavior for granting or denying access permissions which can be applied to an access score for each of the permissions within the set. For example, if a manager grants access to a permission that 30% of the employee group holds for the next n employees in a short period of time, the system 200 will add a weighted factor of 25% to the access score for the permission and thus increasing the placement of the permission on the suggested permissions set 214. While the weighted factor of 25% is noted in this example, any type of weighted factor can be applied to the access score and can be defined by a user of the system or pre-defined in the system. The same weighted system can work with permissions that are rejected in a short period of time utilizing a negative weighted factor.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting-data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for onboarding a new employee to an organization, the method comprising:
   receiving, by a processor, employee data comprising an employee group associated with the new employee of the organization;
   identifying other employees that belong to the employee group, wherein the employee group comprises employees with a same manager;
   obtaining a set of permissions associated with each of the other employees;
   determining a set of group permissions based on a combination of the set of permissions of each of the other employees;
   calculating an access score for each of the set of group permissions;
   determining a set of suggested access permissions for the new employee based on the set of group permissions and the access score;
   receiving historical access permissions data comprising past access permissions granted over a period of time by the same manager;
   determining a weighted value for each of the suggested access permissions based on the historical access permissions data; and
   adjusting the access score for each of the suggested access permissions based upon the weighted value.

2. The method of claim 1, further comprising:
   responsive to receiving the set of suggested access permissions, granting each of the suggested access permission for each of the set of access permissions based on the access score.

3. The method of claim 1, further comprising:
   obtaining a first threshold and a second threshold, wherein the first threshold is larger than the second threshold; and
   grouping the set of suggested access permissions into three categories based on the first threshold and the second threshold.

4. The method of claim 3, wherein the three categories are provisionally grant permission, manager approval needed, and automatic deny permission.

5. The method of claim 4, wherein the suggested access permissions are grouped into the provisionally grant permission category based on a determination that the access score for the suggested access permissions exceed the first threshold;
   wherein access permissions are grouped into the manager approval needed category based on a determination that the access score for the suggested access permissions exceed the second threshold and do not exceed the first threshold; and
   wherein the suggested access permissions are grouped into the automatic deny permission category based on a determination that the access score for the suggested access permissions do not exceed the second threshold.

6. The method of claim 1, wherein the set of permissions include access to an information technology infrastructure of the organization and access to a physical infrastructure of the organization.

7. A system for onboarding a new employee to an organization, the system comprising:
   a processor coupled to a memory, the processor configured to perform a method comprising:
   receiving, by a processor, employee data comprising an employee group associated with the new employee of the organization;
   identifying other employees that belong to the employee group, wherein the employee group comprises employees with a same manager;
   obtaining a set of permissions associated with each of the other employees;
   determining a set of group permissions based on a combination of the set of permissions of each of the other employees;
   calculating an access score for each of the set of group permissions;
   determining a set of suggested access permissions for the new employee based on the set of group permissions and the access score;
   receiving historical access permissions data comprising past access permissions granted over a period of time;
   determining a weighted value for each of the suggested access permissions based on the historical access permissions data; and
   adjusting the access score for each of the suggested access permissions based upon the weighted value.

8. The system of claim 7, further comprising:
responsive to receiving the set of suggested access permissions, granting each of the suggested access permission for each of the set of access permissions based on the access score.

9. The system of claim 7, further comprising:
obtaining a first threshold and a second threshold, wherein the first threshold is larger than the second threshold; and
grouping the set of suggested access permissions into three categories based on the first threshold and the second threshold.

10. The system of claim 9, wherein the three categories are provisionally grant permission, manager approval needed, and automatic deny permission.

11. The system of claim 10, wherein the suggested access permissions are grouped into the provisionally grant permission category based on a determination that the access score for the suggested access permissions exceed the first threshold;
wherein access permissions are grouped into the manager approval needed category based on a determination that the access score for the suggested access permissions exceed the second threshold and do not exceed the first threshold; and
wherein the suggested access permissions are grouped into the automatic deny permission category based on a determination that the access score for the suggested access permissions do not exceed the second threshold.

12. The method of claim 7, wherein the set of permissions include access to an information technology infrastructure of the organization and access to a physical infrastructure of the organization.

13. A computer program product for onboarding a new employee to an organization, the computer program product including a non-transitory computer readable storage medium having computer readable program code embodied therewith, the computer readable program code including computer readable program code configured to perform a method, the method comprising:
receiving, by a processor, employee data comprising an employee group associated with the new employee of the organization;
identifying other employees that belong to the employee group, wherein the employee group comprises employees with a same manager;
obtaining a set of permissions associated with each of the other employees;
determining a set of group permissions based on a combination of the set of permissions of each of the other employees;
calculating an access score for each of the set of group permissions; and
determining a set of suggested access permissions for the new employee based on the set of group permissions and the access score;
receiving historical access permissions data comprising past access permissions granted over a period of time by the same manager;
determining a weighted value for each of the suggested access permissions based on the historical access permissions data; and
adjusting the access score for each of the suggested access permissions based upon the weighted value.

14. The computer program product of claim 13, further comprising:
responsive to receiving the set of suggested access permissions, granting each of the suggested access permission for each of the set of access permissions based on the access score.

15. The computer program product of claim 13, further comprising:
obtaining a first threshold and a second threshold, wherein the first threshold is larger than the second threshold; and
grouping the set of suggested access permissions into three categories based on the first threshold and the second threshold.

16. The computer program product of claim 15, wherein the three categories are provisionally grant permission, manager approval needed, and automatic deny permission.

17. The computer program product of claim 16, wherein the suggested access permissions are grouped into the provisionally grant permission category based on a determination that the access score for the suggested access permissions exceed the first threshold;
wherein access permissions are grouped into the manager approval needed category based on a determination that the access score for the suggested access permissions exceed the second threshold and do not exceed the first threshold; and
wherein the suggested access permissions are grouped into the automatic deny permission category based on a determination that the access score for the suggested access permissions do not exceed the second threshold.

* * * * *